United States Patent
Dirscherl et al.

(10) Patent No.: US 7,502,814 B2
(45) Date of Patent: Mar. 10, 2009

(54) DEVICE AND METHOD FOR GENERATING A PSEUDORANDOM SEQUENCE OF NUMBERS

(75) Inventors: Gerd Dirscherl, Munich (DE); Rainer Goettfert, Munich (DE); Bernd Meyer, Munich (DE); Jean-Pierre Seifert, Hillsborough, OR (US)

(73) Assignee: Infineon Technologies AG, Neubiberg (DE)

( * ) Notice: Subject to any disclaimer, the term of this patent is extended or adjusted under 35 U.S.C. 154(b) by 585 days.

(21) Appl. No.: 11/120,659

(22) Filed: May 2, 2005

(65) Prior Publication Data

US 2006/0067380 A1    Mar. 30, 2006

Related U.S. Application Data

(63) Continuation of application No. PCT/EP03/12006, filed on Oct. 29, 2003.

(30) Foreign Application Priority Data

Oct. 31, 2002   (DE)   ................ 102 50 831

(51) Int. Cl.
*G06F 1/02* (2006.01)
(52) U.S. Cl. ..................................... 708/250
(58) Field of Classification Search .......... 708/250–256
See application file for complete search history.

(56) References Cited

U.S. PATENT DOCUMENTS

| | | | | |
|---|---|---|---|---|
| 4,974,184 A | * | 11/1990 | Avra | 708/252 |
| 5,365,585 A | * | 11/1994 | Puhl et al. | 708/250 |
| 5,446,683 A | * | 8/1995 | Mullen et al. | 708/256 |
| 5,974,433 A | * | 10/1999 | Currie | 708/252 |
| 6,014,446 A | * | 1/2000 | Finkelstein | 708/252 |
| 6,594,680 B1 | * | 7/2003 | Gu et al. | 708/256 |
| 7,012,950 B1 | * | 3/2006 | Kim | 708/252 |
| 7,046,803 B2 | * | 5/2006 | Lee et al. | 708/252 |
| 7,142,675 B2 | * | 11/2006 | Cheng et al. | 708/250 |

FOREIGN PATENT DOCUMENTS

| | | |
|---|---|---|
| DE | 27 34 302 A1 | 2/1979 |
| DE | 197 17 110 A1 | 10/1998 |
| EP | 0 340 694 A2 | 11/1989 |

OTHER PUBLICATIONS

Hellebrand, S. et al; "Mixed-Mode BIST Using Embedded Processors"; Proceedings of The International Test Conference, Washington, D.C., USA, Oct. 20, 1996, pp. 195-204, XP000799910.

Mita, R., et al.; "A Novel Pseudo Random Bit Generator for Cryptography Applications"; 9th International Conference on Electronics, Circuits and Systems 2002, vol. 2, Sep. 15, 2002, pp. 489-492, XP010614393.

* cited by examiner

*Primary Examiner*—Chat C Do
(74) *Attorney, Agent, or Firm*—Dickstein, Shapiro, LLP.

(57) ABSTRACT

A device for generating a pseudorandom sequence of numbers includes a feedforward coupler, which has a plurality of memory units, and a feedback coupler connected between an input and an output of the feedforward coupler. The feedback coupler includes a changeable feedback characteristic and is embodied to change the feedback characteristic depending on a state of a memory unit of the plurality of memory units of the feedforward coupler.

14 Claims, 3 Drawing Sheets

- if contents of memory element 4=0
  then feedback polynomial     $x^8+x^7+1$

- if contents of memory element 4=0
  then feedback polynomial     $x^8+x^6+1$

DEVICE AND METHOD FOR GENERATING A PSEUDORANDOM SEQUENCE OF NUMBERS

CROSS-REFERENCE TO RELATED APPLICATION

This application is a continuation of copending International Application No. PCT/EP03/12006, filed Oct. 29, 2003, which designated the United States and was not published in English, and is incorporated herein by reference in its entirety.

BACKGROUND OF THE INVENTION

1. Field of the Invention

The present invention relates to number generators, and in particular to number generators for generating a pseudorandom sequence of numbers.

2. Description of Related Art

Such a well-known random number generator is illustrated in FIG. 5. The pseudorandom number generator of FIG. 5, which is also referred to as a linear feedback shift register, includes a plurality of memory elements 51, 52, 53, 54, which in FIG. 5 are numbered from 0 to n. The memory cells can be initialized to a starting value via initializing means 55. The memory cells 51 to 54, as a whole, form feedforward means, while the linear shift register formed by the memory cells 51 to 54 is fed back by feedback means coupled between an output 56 of the circuit and the memory cell n. In detail, the feedback means includes one or several combining means 54, 58 fed by respective feedback branches 59a, 59b, 59c, as is exemplarily illustrated in FIG. 5. The output value of the last combining means 58 is fed into the memory cell n indicated by 54 in FIG. 5.

The linear feedback shift register shown in FIG. 5 is operated by a clock such that the occupancy of the memory cells, referring to FIG. 5, is shifted by one step to the left in each clock cycle so that the state stored in the memory means 51 is output as a number in each clock cycle, while at the same time the value at the output of the last combining means 58 is fed into the first memory unit n of the sequence of memory units. The linear feedback register illustrated in FIG. 5 thus provides a sequence of numbers responsive to a sequence of clock cycles. The sequence of numbers obtained at the output 56 depends on the starting state set up by the initializing means 55 before starting the shift register. The starting value input by the initializing means 55 is also referred to as a seed, which is why such arrangements illustrated in FIG. 5 are also referred to as seed generators.

The sequence of numbers obtained at the output 56 is referred to as a pseudorandom sequence of numbers, since the numbers seem to follow one another in a random way, but, as a whole, are periodic even though the period duration is large. In addition, the sequence of numbers can be repeated uniquely and thus has a pseudorandom nature if the initializing value fed to the memory elements by the initializing means 54 is known. Such shift registers are, for example, employed as key stream generators to provide a stream of encrypting/decrypting keys depending on a special initializing value (seed).

Such shift registers illustrated in FIG. 5 have the disadvantage of a small linear complexity. Thus, 2 n bits of the output sequence suffice in an n bit LFSR (linear feedback shift register) to calculate the entire sequence. The advantage of such well-known LFSRs illustrated in FIG. 5, however, is that the hardware expenditure is very small.

In addition, there are irregularly clocked LFSRs. They have a somewhat increased hardware expenditure with an almost always lower period. The linear complexity can, however, be considerably higher. A disadvantage of such irregularly clocked devices, however, is the fact that, due to the irregular clocking, the output sequence could be deducted in principle by current measurements in an SPA (simple power analysis). By employing shift register devices as parts of key generators which generate data to be kept secret inherently, that is key data, it is of especial importance that they be protected from any kind of cryptographic attack.

On the other hand, there is the requirement for such devices, in particular when they are to be accommodated on chip cards, that the hardware expenditure be small. Put differently, the chip area such devices occupy needs to be as small as possible. This is due to the fact that, in semiconductor manufacturing, the chip area of an entire device in the end determines the price and thus the profit margin of the chip manufacturer. In addition, especially in chip cards, a specification is usually such that a customer says that a processor chip can have a maximum area in square millimeters, on which most various functionalities must be accommodated. Thus, it is up to the circuit manufacturer to distribute this precious area to the individual components. As regards cryptographic algorithms, which are becoming increasingly complex, efforts of the chip manufacturer are directed to the chip having as much memory as possible to be able to calculate even operating memory-intense algorithms in an acceptable time. The chip area for key generators and other such components thus needs to be kept as small as possible to be able to accommodate more memory on a given chip area.

The general requirement to key generators and devices for generating a pseudorandom sequence of numbers, respectively, thus is, on the one hand, to be safe and, on the other hand, to require as little space as possible, that is to have the smallest hardware expenditure possible.

In principle, linear shift registers have different applications in coding theory, cryptography and other electro-technological areas. The output sequences of linear shift registers comprise useful structural characteristics which can be divided into algebraic characteristics and distribution characteristics.

It is well-known that an output sequence of an n step linear shift register, as has been explained, is periodic. The length of the period can be quite large and is, with regard to n, that is the number of memory elements, often exponential. The length of the period, in particular, is $2^n-1$, when the shift register is based on a primitive feedback polynomial.

The linear complexity of such a sequence, however, is at most n. The linear complexity of a periodic sequence, according to the definition, equals the number of cells of the smallest possible shift register which can generate the sequence considered.

Due to this fact, it can be shown that, as has been discussed, 2 n subsequent expressions of the sequence suffice to predict all the remaining expressions of the sequence. In addition, there is an efficient algorithm, the so-called Berlekamp-Massey algorithm, to calculate the parameters required to obtain the entire sequence. Thus, sequences of linear shift registers, despite their potentially large periods and their statistically good distributing characteristics, are not suitable directly as key sequences in so-called current ciphers. In addition, there are other applications in which the comparably low linear complexity of a sequence generated by a linear shift register must be seen as a disadvantage.

Usually, linear shift registers are described by their characteristic polynomial. The degree of the characteristic polynomial equals the number of delay elements, usually embodied as flip-flops, of the shift register considered. The exponents of the terms of f(x), except for the leading term, correspond to the shift elements of the shift register contributing to a feedback. The linear shift register illustrated in FIG. 5 would thus have a characteristic polynomial of the following kind:

$$F(x)=x^{n+1}+x^n+\ldots+x+1$$

If such linear shift registers, as are exemplarily illustrated in FIG. 5, are loaded with an initializing state by the initializing means 55, wherein this state is also referred to as a starting state vector, they will typically output a periodic sequence having a certain pre-period and a subsequent period, depending on the implementation. Linear shift registers are always periodic. In technological applications, it is often strived for that the output sequence have both a large period length and a high linear complexity.

SUMMARY OF THE INVENTION

It is an object of the present invention to provide a safe and low-expenditure-implementable concept for generating a pseudorandom sequence of numbers.

In accordance with a first aspect, the present invention provides a device for generating a pseudorandom sequence of numbers, having: feedforward means having a plurality of memory means, wherein the feedforward means has an input and an output for outputting the sequence of random numbers; and feedback means having a changeable feedback characteristic and being connected between the input and the output of the feedforward means, wherein the feedback means is formed to change the feedback characteristic depending on a state of a memory means of the plurality of memory means such that the pseudorandom sequence has a linear complexity greater than a linear complexity linear in n, n being the number of memory means.

In accordance with a second aspect, the present invention provides a method for generating a pseudorandom sequence of numbers using a feedforward means having a plurality of memory means, wherein the feedforward means has an input and an output, and using a feedback means connected between the input and the output of the feedforward means such that the pseudorandom sequence has a linear complexity greater than a linear complexity linear in n, n being the number of memory means, having the steps of: initializing the memory means of the feedforward means to a predetermined starting value; responsive to a state of a selected memory means, setting a changeable feedback characteristic of the feedback means; outputting a state of a memory means connected to the output of the feedforward means to obtain a number of the sequence of numbers; re-occupying the plurality of memory means based on a previous state of the memory means and on an output of the feedback means; and repeating the steps of setting, outputting and re-occupying to obtain the sequence of numbers.

BRIEF DESCRIPTION OF THE DRAWINGS

Preferred embodiments of the present invention will be detailed subsequently referring to the appended drawings, in which.

DESCRIPTION OF THE PREFERRED EMBODIMENTS

Figure 1:
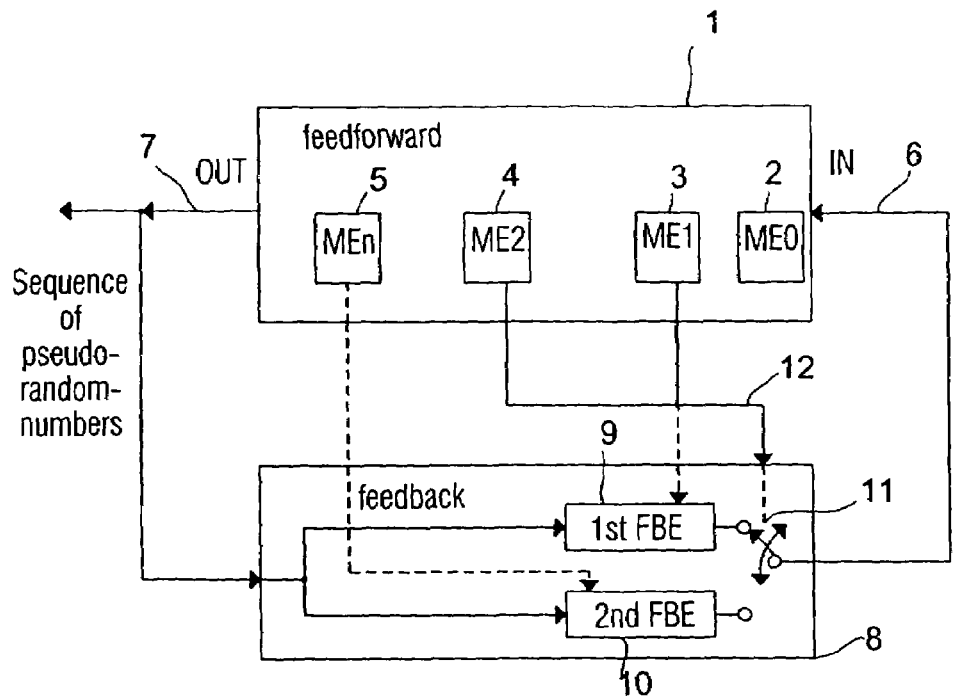
FIG. 1 is a principle block diagram of an inventive device for generating a pseudorandom sequence of numbers.

The present invention is based on the finding that a low-expenditure-implementable and nevertheless safe concept for generating a pseudorandom sequence of numbers can be obtained by "superimposing" two or several feedback shift registers. Put differently, an inventive device for generating a pseudorandom sequence of numbers includes feedforward means having a plurality of memory means and feedback means connected between an input of the feedforward means and an output of the feedforward means, wherein the feedback means is changeable and also formed to change its feedback characteristic depending on a state of a memory means of the plurality of memory means of the feedforward means. Depending on the state in a memory means of the plurality of memory means, one of the two feedback characteristics is thus selected when only two feedback characteristics are available. If this memory means has another state in a later cycle, the inventive device will use the other of the at least two different feedback characteristics. One can thus say that the inventive device for generating a pseudorandom sequence of numbers itself chooses its feedback characteristic, that is its feedback polynomial with the example of an inventive linear feedback shift register, while the feedback characteristic is fixedly predetermined in well-known feedback shift registers.

According to the invention, in a preferred embodiment of the present invention, two or several linear shift registers having different, not necessarily primitive, feedback polynomials are superimposed to a single shift register, wherein depending on the values of one or several register cells, shiftings between the different linear feedbacks are performed.

The hardware expenditure is comparable to a normal linear feedback shift register. In addition, the maximum period duration can also be obtained. Depending on the embodiment, the linear complexity, however, is larger than in a linear feedback shift register. Thus, linear feedback shift registers typically have a linear complexity of n, n being the number of memory elements. The inventive concept allows generating sequences having linear complexities which are exponential in n.

The linear complexity profile typically has numerous jumps and is thus similar to a true random sequence.

Regarding the well-known, irregularly clocked linear feedback shift registers, the inventive shift register will be more insensitive towards simple power attacks or timing attacks, if clocking takes place regularly, since the shift between different feedback polynomials is performed by the inventive feedback shift register itself, independently of clocking.

The inventive concept is, however, not only applicable to shift registers having a linear feedback. The plurality of memory means need not necessarily be connected serially in a chain but can also be arranged in a mixture of a serial and parallel architecture. In addition, different feedback characteristics are feasible which need not necessarily include the logic basic functions but can also be more complicated arithmetic functions or combinations of logic functions.

According to the invention, it is only essential that, depending on the state of one or several memory means, the feedback characteristic of the feedback means is varied.

In a preferred embodiment of the present invention, the different feedback characteristics between which can be shifted differ in that, depending on the feedback characteristic, the values of different memory means of the plurality of memory means are fed to feedback.

Alternatively, the inventive device can, however, be also implemented such that it is always the same memory means to contribute to feedback, but that the arithmetic and/or logic combining rule in the feedback means varies from feedback characteristic to feedback characteristic.

In addition, combinations of those two options are useful in various applications.

The inventive device for generating a pseudorandom sequence of numbers is of especial advantage in its simplest form, since it can then be implemented without additional hardware cost compared to the cost for a linear shift register having the same number of flip-flops. The inventive concept thus makes it possible to generate, with the same hardware cost, pseudorandom sequences of numbers having a far higher linear complexity than can be generated by linear shift registers comparable in size.

The inventive concept thus unites the requirements on the device for generating a pseudorandom sequence of numbers, especially in the area of cryptography, for a high period as maximum as possible, for a high linear complexity, for a good linear complexity profile, for a low hardware expenditure (area) and a low susceptibility as regards current attacks (such as, for example, a simple power analysis or a differential power analysis) and timing attacks.

FIG. 1 shows an inventive device for generating a pseudorandom sequence of numbers, having a feedforward means 1 comprising a sequence of memory units 2 to 5, and further including an input 6 and an output 7 corresponding to the output of the device for outputting the sequence of pseudorandom numbers. It is to be pointed out that the sequence of pseudorandom numbers can be supplemented by further means not shown in FIG. 1 to buffer, combine in any other way, etc. sequences of random numbers.

The inventive device shown in FIG. 1 further includes feedback means 8 comprising a changeable feedback characteristic and being connected between the input 6 and the output 7 of the feedforward means 1. The changeable feedback characteristic of the feedback means 8 is illustrated in FIG. 1 in that the feedback means 8 can have a first feedback characteristic 9 or a second feedback characteristic 10, wherein switching can be performed by switching means 11 between the first feedback characteristic 9 and the second feedback characteristic 10. The control signal for the switching means 11 is, only exemplarily, provided by the fourth memory means ME2 as is symbolically illustrated by a signal path 12. In an embodiment shown in FIG. 1, the first feedback characteristic 9 and the second feedback characteristic 10 differ by the fact that in the case of the first feedback characteristic, the state of the memory means 1 (3) will enter into feedback, while in the case of the second feedback characteristic, the state of the memory means 5 (MEn) contributes to feedback.

Alternatively or additionally, the feedback means 8 can be formed such that in the feedback characteristic combining the value at the output 7 of the feedforward means and an internal state of the feedforward means, a different combination rule is used depending on the feedback characteristic selected. Thus, for example, an AND combination could be employed in the first feedback characteristic for combining the value at the output 7 and the value of the register cell 3, while the second feedback characteristic differs from the first feedback characteristic by the fact that an OR combination and not an AND combination is employed for combining the two mentioned values. It is obvious for those skilled in the art that any kinds of different combination rules can be employed.

In addition, values of memory means ME1 and MEn, respectively, need not be fed directly to combining means in the feedback means, but these values can, for example, be inverted, be combined with one another or processed in any way before the processed values are fed to combining means.

In addition, it is not essential that the switching means 11 be controlled directly by the state of the memory unit ME2. Instead, the state of the memory means ME2 could be inverted, be processed logically or in an arithmetic way in any way or even be combined with the state of one or several further memory means as long as a device for generating a pseudorandom sequence of numbers is obtained, which has a feedback means the feedback characteristic of which is not static but can be varied dynamically depending on the feedforward means and, in particular, on one or several states in memory units of the feedforward means.

Figure 2:
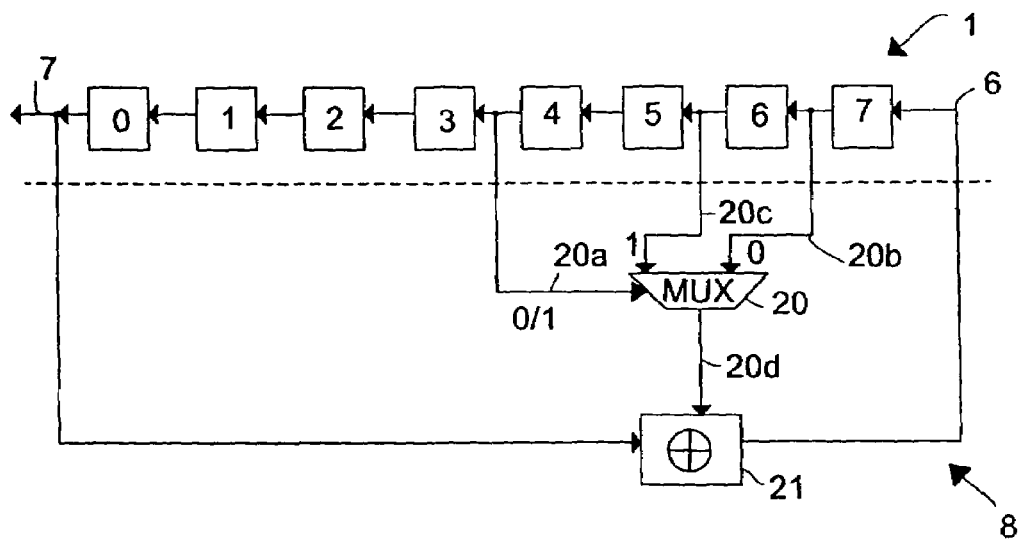
FIG. 2 shows a preferred embodiment of the present invention with the example of an eight-step linear shift register having a variable feedback characteristic.

FIG. 2, as a preferred embodiment of the present invention, shows an 8-bit shift register in which, depending on the state of the memory means having the number 4, a multiplexer 20 is controlled via a control input 20a. If the control input 20a is on a 0 state, that is if a 0 state is present in the memory cells having the number 4, the multiplexer will be controlled such that it connects the state of the memory means having the number 7 on a first input line 20b of it to an output line 20d. This would correspond to the effect of a linear shift register having the following feedback polynomial:

$$x^8+x^7+1$$

If the control input 20a, however, is on a one-state, the state of the memory means having the number 6, at a second input 20c, will be connected to the output line 20d of the multiplexer 20. The output line 20d is connected to combining means 21 to which, in the embodiment shown in FIG. 2, the value at the output 7 of the feedforward means, which at the same time forms the output of the device for generating a pseudorandom sequence of number, is fed. The result calculated by combining means 21 in turn is fed to the first memory means having the number 7 in FIG. 2.

If the contents of the memory cell having the number 4 equals 1, the following feedback polynomial will be present:

$$x^8+x^6+1$$

It can be seen from the above that switching between the two mentioned feedback polynomials is performed depending on the contents of the memory cell having the number 4 of the feedforward means 1.

It has been found out that the linear complexities of sequences obtained according to the invention are high, that is between 234 and 254. It is to be pointed out that the period length of a sequence generated by any 8-step shift register has a maximum of 255. The expected value for the linear complexity of a random bit string of the length 255 is 255/2=127.5.

The simplest of all eight-step shift registers which can generate a sequence is the shift register illustrated in FIG. 2 having the two feedback polynomials illustrated in FIG. 2. As regards the theory of the linear shift register as a comparative example, it is to be pointed out that there are 16 primitive polynomials of degree 8. Each such polynomial describes a linear shift register which can generate a sequence having a period length of 255 and the linear complexity 8. In contrast, there are many more shift registers—that is 2020—according to the present invention which can generate sequences having period lengths of 255 according to the present invention.

In addition, the sequences generated by the inventive shift registers have much larger linear complexities than their analogous embodiments according to the prior art. As has been discussed, the embodiment shown in FIG. 2 is preferred among all the examined possibilities for an 8-bit shift register having feedback means, since it entails the simplest hardware expenditure, at the same time has a maximum period duration and additionally comprises a maximum linear complexity.

Figure 4:
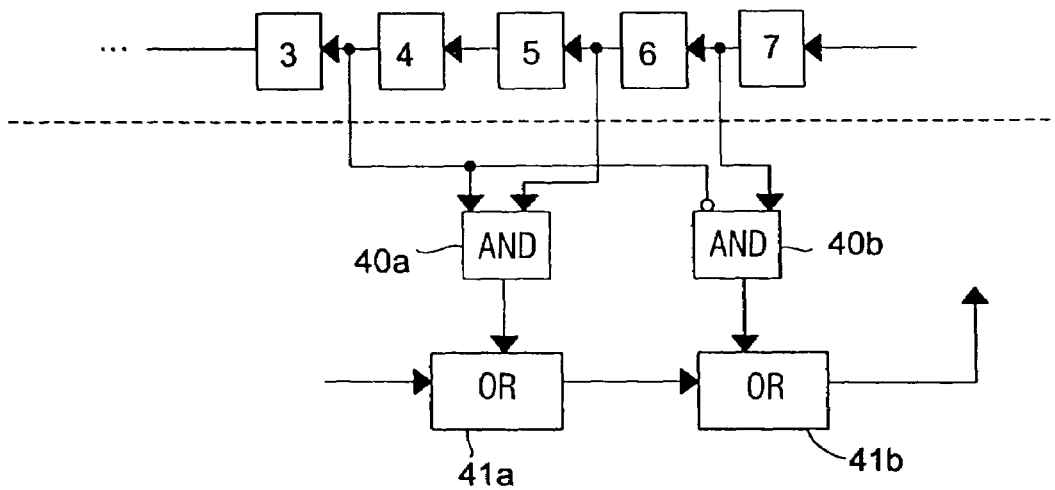
FIG. 4 shows a part of a block diagram of an inventive device for illustrating an alternative implementation of the feedback means of FIG. 2.
Figure 5:
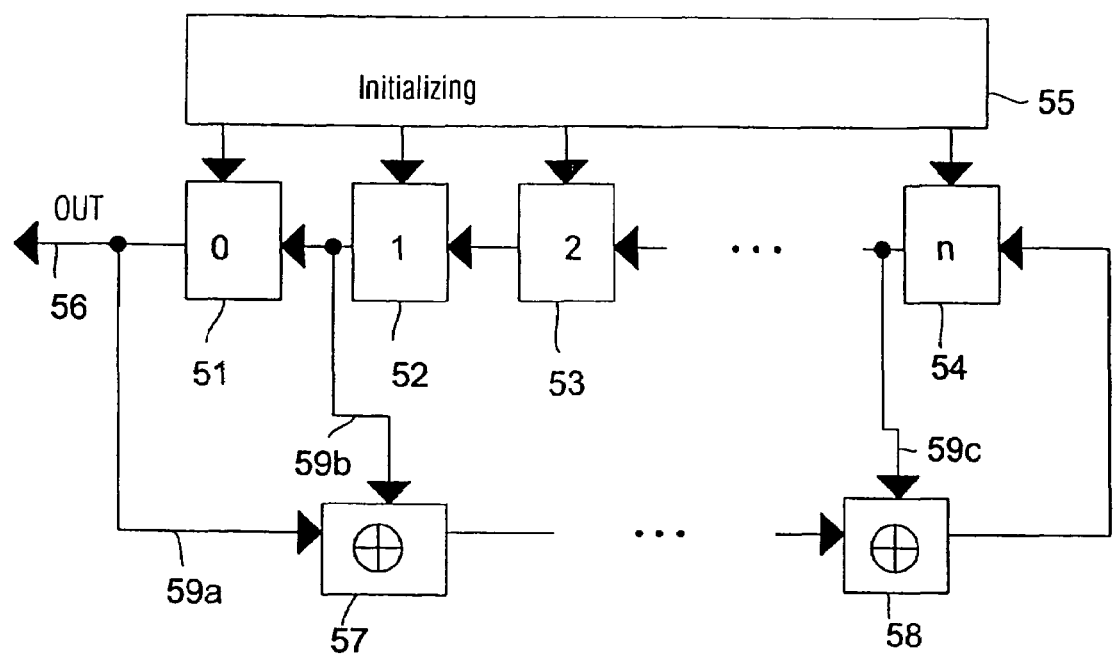
FIG. 5 is a principle block diagram of an inventive linear feedback shift register.

In the following, reference is made to FIG. 4 to illustrate a special implementation of the multiplexer means 20 of FIG. 2. The multiplexer 20 can easily be implemented by two AND gates 40a, 40b which are both connected to OR gates (or XOR gates) 41a, 41b connected in series, as is illustrated in FIG. 4. Specifically, the state of the memory cell 4 is fed to the first AND gate 40a, while the inverted state of the memory cell 4 is fed to the second AND gate 40b. For determining the corresponding feedback polynomial, the contents of the memory cell 6 is fed to the first AND gate 40a as a second input, while the contents of the memory cell is fed to the second AND gate 40b as a second input. In addition, it is to be pointed out that the two OR gates 41a, 41b connected in series can be implemented alternatively. If, however, implementations are required in which each logic gate has two inputs and an output, the illustration exemplarily shown in FIG. 4 will be of advantage.

Figure 3:
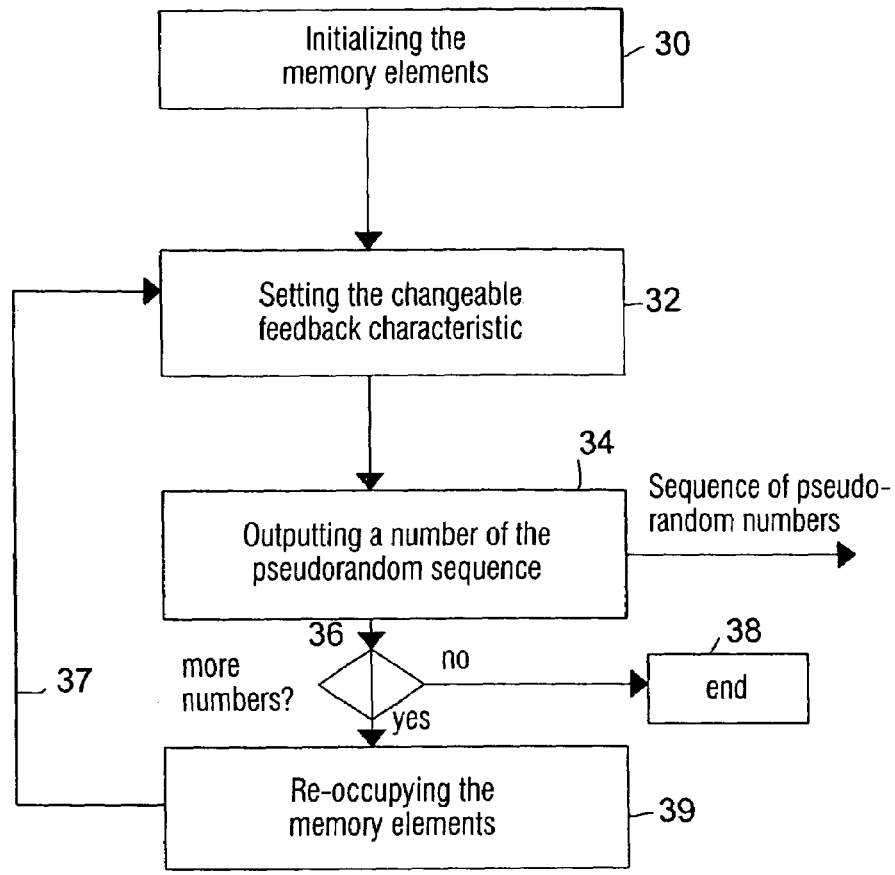
FIG. 3 is a flow chart of an inventive method for generating a pseudorandom sequence of numbers.

FIG. 3 shows a flow chart of an inventive method for generating a pseudorandom sequence of numbers using a feedforward means 1 having a plurality of memory means, which has an input and an output for outputting the sequence of numbers, as well as feedback means having a changeable feedback characteristic and being connected between the input and the output. The method at first includes a step of initializing 30 the memory means in the feedforward means to a predetermined starting value.

Responsive to a state of a memory means of the plurality of memory means of the feedforward means, a changeable feedback characteristic of the feedback means is set in step 32. Subsequently, a state of a memory means connected to the output of the feedforward means is output (step 34) to obtain a number of the sequence of random numbers. Then, it is examined in a determination block 36 whether further random numbers are required. If this question is answered with a no, the method will end in step 38. If it is, however, determined that further numbers are required, the determination block 36 will be answered with a "yes", whereupon step 39 follows in which the plurality of memory means is re-occupied based on a previous state of the memory means and on an output of the feedback means. As is indicated by a loop 37, the steps of setting 32, outputting 34 and re-occupying 39 are repeated as often as is desired to finally obtain the pseudorandom sequence of numbers.

It is to be pointed out that the inventive method can be performed using a regular clock or even using an irregular clock, even though the variation having the regular clock is preferred with respect to a better safety as regards power or timing attacks.

In the case of the linear shift register illustrated in FIG. 2, it is to be pointed out that re-occupying the plurality of memory means takes place serially, based on the previous state of the memory means which—seen as a whole—is shifted by one step to the left so that on the output side a state of the memory means 0 "drops out". This "dropped out" value is the number output in step 34. By left-shifting the state considered as a whole of the entire memory means, the memory means having the number 7 at the very right in FIG. 2 can be re-occupied. The plurality of memory means and, in particular, the memory means 7 are thus re-occupied depending on an output of the feedback means at the current clock time.

The inventive method, as has been illustrated with reference to FIG. 3, can be implemented, depending on the situation given, in hardware in the form of a state machine or in software using a programmable processor. The present invention thus relates to a computer-readable medium on which the steps of the inventive method are stored in the form of a code which, when it is processed on a corresponding processor, results in executing the inventive method. The present invention thus also relates to a computer program which, when it is executed on a computer, results in executing the inventive method.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for generating a pseudorandom sequence of numbers, comprising:
    a feedforward coupler having a plurality of memory units, wherein the feedforward coupler comprises a feedforward coupler input and a feedforward coupler output for outputting the sequence of random numbers; and
    a feedback coupler comprising a changeable feedback characteristic and being connected between the feedforward coupler input and the feedforward coupler output, wherein the feedback coupler is formed to change the feedback characteristic depending on a state of a memory unit of the plurality of memory units of the feedforward coupler,
    wherein the feedback coupler comprises:
        a multiplexer having a first multiplexer input, a second multiplexer input, a multiplexer control input and a multiplexer output, wherein the multiplexer is formed to connect, depending on a state of a memory unit, either the first multiplexer input to the second multiplexer input to the multiplexer output,
        a combiner formed to combine the multiplexer output with the feedforward coupler output, the combiner having a combiner output connected to the feedforward coupler input or connected to a calculator, the calculator having a calculator output connected to the feedforward coupler input.

2. The device according to claim 1, wherein the feedforward coupler is formed as a shift register, wherein the memory units are connected in series.

3. The device according to claim 1, wherein the memory units are formed as flip-flops.

4. The device according to claim 1, wherein the changeable feedback characteristic has a first feedback polynomial and a second feedback polynomial, wherein the second feedback polynomial differs from the first feedback polynomial.

5. The device according to claim 1,
    wherein the feedforward coupler comprises at least three memory units connected in series,
    wherein the feedback coupler is formed to employ a state of a second memory unit as the first feedback characteristic for a feedback in the case of a first state of a first of the memory units, and wherein the feedback coupler is formed to employ a state of a third memory unit as a second feedback characteristic for a feedback in the case of a second state of the first memory unit.

6. The device according to claim 1, wherein the feedback coupler is formed to use as a changeable feedback characteristic a combination of a number at the output of the feedforward coupler and a state of at least one of the plurality of memory units.

7. The device according to claim 6, wherein the feedback coupler is formed to vary a kind of the combination depending on a state of a memory unit.

8. The device to claim 1, wherein the multiplexer is implemented using two AND gates, each of which is connected to an OR gate.

9. The device according to claim 1, further comprising: a clocker for providing a regular clock for the feedforward coupler.

10. The device according to claim 1, further comprising: a clocker for providing an irregular clock for the feedforward coupler.

11. The device according to claim 1, further comprising an initializer formed to initialize the plurality of memory units to different states.

12. The device according to claim 1, wherein the sequence of numbers is a sequence of bits, wherein the feedforward coupler comprises a sequence of binary memory elements, and wherein the feedback coupler is formed in binary logic.

13. A method for generating a pseudorandom sequence of numbers, comprising:
using a feedforward coupler having a plurality of memory units, wherein the feedforward coupler comprises a feedforward coupler input and a feedforward coupler output formed to output the sequence of random numbers, and
using a feedback coupler comprising a changeable feedback characteristic and being connected between the feedforward coupler input and the feedforward coupler output, wherein the feedback coupler is formed to change the feedback characteristic depending on a state of a memory unit of the plurality of memory units of the feedforward coupler;
initializing the memory units of the feedforward coupler to a predetermined starting value;
responsive to a state of a selected memory unit, selling a changeable feedback characteristic of the feedback coupler by using a multiplexer having a first multiplexer input, a second multiplexer input, a multiplexer control input and a multiplexer output, wherein the multiplexer is formed to connect, depending on a state of a memory unit, either the first multiplexer input or the second multiplexer input to the multiplexer output and a combiner for combining the multiplexer output with the feedforward coupler output, the combiner having a combiner output connected to the feedforward coupler input or connected to a calculator, the calculator having a calculator output connected to the feedforward coupler input;
outputting a state of a memory unit connected to the output of the feedforward coupler to obtain a number of the sequence of numbers;
re-occupying the plurality of memory units based on a previous state of the memory units and on an output of the feedback coupler; and
repeating the steps of selling, outputting and re-occupying to obtain the sequence of numbers.

14. A system for generating a pseudorandom sequence of numbers, comprising:
a feedforward coupler having a plurality of memory units, wherein the feedforward coupler comprises a feedforward coupler input and a feedforward coupler output for outputting the sequence of random numbers; and
a feedback coupler comprising a changeable feedback characteristic and being connected between the feedforward coupler input and the feedforward coupler output, wherein the feedback coupler is formed to change the feedback characteristic depending on a state of a memory unit of the plurality of memory units of the feedforward coupler;
means for initializing the memory units of the feedforward coupler to a predetermined starting value;
means for setting a changeable feedback characteristic of the feedback coupler in response to a state of a selected memory unit, the means for selling comprising:
a multiplexer having a first multiplexer input, a second multiplexer input, a multiplexer control input and a multiplexer output, wherein the multiplexer is formed to connect, depending on a state of a memory unit, either the first multiplexer input or the second multiplexer input to the multiplexer output,
a combiner for combining the multiplexer output with the feedforward coupler output, the combiner having a combiner output connected to the feedforward coupler input or connected to a calculator, the calculator having a calculator output connected to the feedforward coupler input;
means for outputting a state of a memory unit connected to the output of the feedforward coupler to obtain a number of the sequence of numbers;
means for re-occupying the plurality of memory units based on a previous state of the memory units and on an output of the feedback coupler; and
means for repeating the steps of setting, outputting and re-occupying to obtain the sequence of numbers.

* * * * *

UNITED STATES PATENT AND TRADEMARK OFFICE
CERTIFICATE OF CORRECTION

PATENT NO. : 7,502,814 B2  Page 1 of 1
APPLICATION NO. : 11/120659
DATED : March 10, 2009
INVENTOR(S) : Gerd Dirscherl et al.

It is certified that error appears in the above-identified patent and that said Letters Patent is hereby corrected as shown below:

In Col. 10, line 12, Claim 13, delete "selling" and insert --setting-- therefor.

Signed and Sealed this

Fourteenth Day of July, 2009

JOHN DOLL
*Acting Director of the United States Patent and Trademark Office*